(12) United States Patent
Fuerst

(10) Patent No.: US 9,566,601 B2
(45) Date of Patent: Feb. 14, 2017

(54) METHOD AND DOCTOR BLADE DEVICE FOR SPREADING A RESIN PASTE ONTO A CARRIER FILM, AND A RESIN SHEET INSTALLATION FOR PRODUCING RESIN SHEETS

(71) Applicant: Dieffenbacher GmbH Maschinen- und Anlagenbau

(72) Inventor: Tobias Fuerst, Karlsruhe (DE)

(73) Assignee: Dieffenbacher GmbH Maschinen- und Anlangenbau, Eppingen (DE)

( * ) Notice: Subject to any disclaimer, the term of this patent is extended or adjusted under 35 U.S.C. 154(b) by 25 days.

(21) Appl. No.: 14/395,913

(22) PCT Filed: Apr. 23, 2013

(86) PCT No.: PCT/EP2013/058370
§ 371 (c)(1),
(2) Date: Oct. 21, 2014

(87) PCT Pub. No.: WO2013/160290
PCT Pub. Date: Oct. 31, 2013

(65) Prior Publication Data
US 2015/0118402 A1   Apr. 30, 2015

(30) Foreign Application Priority Data

Apr. 25, 2012  (DE) .................. 10 2012 103 648

(51) Int. Cl.
*B29C 70/54* (2006.01)
*B05C 11/04* (2006.01)
(Continued)

(52) U.S. Cl.
CPC ................ *B05C 11/04* (2013.01); *B05C 3/18* (2013.01); *B05C 9/12* (2013.01); *B29C 31/04* (2013.01);
(Continued)

(58) Field of Classification Search
CPC .......... B29C 70/54; B29C 70/50; B05C 11/04; B05C 11/1002; B05C 9/10; B05C 5/0245
See application file for complete search history.

(56) References Cited

U.S. PATENT DOCUMENTS 2,200,001 A * 5/1940 Kenyon .............. B29C 47/8845
159/9.1
2,582,993 A * 1/1952 Howatt .................. B28B 1/267
156/89.12
(Continued)

FOREIGN PATENT DOCUMENTS

DE    1020050 49 090 A1    5/2006
DE    1020060 25 325 A1    12/2007
(Continued)

OTHER PUBLICATIONS

International Search Report dated Aug. 16, 2013 issued in PCT/EP2013/058370.

*Primary Examiner* — Matthew Daniels
(74) *Attorney, Agent, or Firm* — Foley & Lardner LLP

(57) ABSTRACT

A method for spreading a resin paste onto a carrier film includes feeding resin paste into a doctor blade unit having a doctor blade, using a feed device that includes a discharge opening through which the resin paste is fed from the feed device into the doctor blade unit, moving a carrier film on a base surface through a doctor blade gap that is formed between the doctor blade and the base surface, and spreading the resin paste onto the carrier film using the doctor blade. The discharge opening is positioned to be immersed into the resin paste that is in the doctor blade unit during operation of a doctor blade apparatus configured to perform the method. A resin mat installation for producing resin mats, particularly of SMC, includes at least one doctor blade apparatus as described above.

8 Claims, 4 Drawing Sheets

(51) Int. Cl.
*B29C 70/50* (2006.01)
*B29C 31/04* (2006.01)
*B05C 3/18* (2006.01)
*B05C 9/12* (2006.01)
*B05D 3/12* (2006.01)

(52) U.S. Cl.
CPC ............... *B29C 70/50* (2013.01); *B29C 70/54* (2013.01); *B05D 3/12* (2013.01)

(56) References Cited

U.S. PATENT DOCUMENTS

| | | | | |
|---|---|---|---|---|
| 3,486,482 A | * | 12/1969 | Hunger | ..................... B05C 3/18 118/126 |
| 3,506,538 A | * | 4/1970 | Friedberg | .............. D21F 11/002 162/101 |
| 3,752,690 A | * | 8/1973 | Miller | ................... B29C 43/222 427/198 |
| 4,345,887 A | | 8/1982 | Lanneau et al. | |
| 8,107,056 B1 | * | 1/2012 | Riza | ......................... G01C 3/08 356/4.05 |

FOREIGN PATENT DOCUMENTS

| | | | |
|---|---|---|---|
| DE | 102010002842 | * | 9/2011 |
| EP | 1 386 721 A1 | | 2/2004 |
| WO | WO-2011/057807 A1 | | 5/2011 |
| WO | WO-2011/101927 | | 8/2011 |

* cited by examiner

METHOD AND DOCTOR BLADE DEVICE FOR SPREADING A RESIN PASTE ONTO A CARRIER FILM, AND A RESIN SHEET INSTALLATION FOR PRODUCING RESIN SHEETS

CROSS REFERENCE TO RELATED APPLICATIONS

The present invention is a National Stage of International Application No. PCT/EP2013/058370 filed on Apr. 23, 2013, which claims the benefit of German Patent Application No. 10 2012 103 648.9 filed on Apr. 25, 2012. The entire disclosures of which are incorporated herein by reference.

The invention relates to a method for spreading a resin paste onto a carrier film and a doctor blade apparatus. The invention further relates to a resin mat installation.

The method in accordance with the invention and the doctor blade apparatus in accordance with the invention are used especially in the production of fiber-reinforced formed parts (Sheet Molding Compound, SMC) in a direct process or in the spreading of reactive resin paste onto a carrier material.

Molded parts produced according to the SMC method are thermosetting fiber compound materials that are used mostly due to their good mechanical properties and their low prices. A method for producing fiber-reinforced molded parts (SMC) in direct process is known from the specification EP 1 386 721 A1, wherein the production sequence occurs in a resin mat installation from the mixing of the individual components for the resin base up to the pressing process of a molded part in continuous operation.

As is shown in FIG. 1, the production sequence known from the specification EP 1 386 721 A1 occurs in a resin mat installation 1 from the mixing of the individual components for the resin base 9 up to the pressing process of a molded part in continuous operation by the following method steps: the resin base 9, which is produced by intensive mixing of the precisely dosed component fractions, is finally added a fast-reacting thickening agent, the resin base 9 is then spread in a resin base application region A as required and in proportion onto a bottom belt 2 guided via deflection pulleys 22 and onto an upper belt 3 also guided via deflection pulleys 22 by means of doctor blades 4 and 7 into resin base layers 5 and 8 of a respective thickness; cut glass 6 and/or long fibers are dosed at least onto the bottom resin base layer 5, and after combining the two resin base layers 5 and 8 formed into an endless resin mat 10 in a walking and impregnating section B between the rollers 11 at the bottom and the rollers 12 at the top; the endless resin mat 10 is then guided for a curing process through a tempered thickening transit storage unit 14, wherein the curing process in the thickening section C is controlled by the passage time and the heat in the encapsulated thickening transit storage unit 14; finally, the resin mats 10, which are severed by means of a cutting mechanism 17 into cut mats 18, can be supplied to further processing via a feed belt 19 or pressed in a molding press 20 into molded parts 21.

A further method for producing fiber-reinforced molded parts (SMC) in direct process is known from the specification WO 2011/057807 A1.

The specification WO 2011/101927 further discloses an apparatus for supplying cement sludge for fiber-reinforced cement structural panels, comprising a rotatably mounted tilting box. The cement sludge is supplied by means of a feed line to the tilting box, wherein the feed line is mounted on a carriage which can move back and forth along the length of the tilting box, transversely to the direction of the track.

Blade ink ducts for coloring rollers of a printing machine are further known for example from the specifications DE 10 2006 025 325 A1 and DE 10 2005 049 090 A1, with which printing ink is applied to an ink-absorbing roller.

The doctor blades used in the production of fiber-reinforced molded parts (SMC) in direct process, such as the arrangements designated in FIG. 1 as doctor blades 4 and 7, are usually arranged as doctor blade units, as shown in FIG. 2 by way of example, wherein the resin paste is applied as a thin film to a moved carrier film 55 by the doctor blade 51.

The filling of the doctor blade unit with the resin base, which is usually present as a viscous paste and which will also be referred to below as resin paste, occurs in conventional production of semi-finished goods mostly by a simple hose feed 53, which is attached to the middle of the doctor blade unit 50, so that fresh resin paste is supplied from above. The resin paste accumulates in the doctor blade unit 50 as resin paste 54 on the carrier film 55. The withdrawal of the carrier film 55 beneath the doctor blade unit 50 leads to the consequence that the resin paste in the doctor blade unit 50 is subjected to a rolling motion 57, as indicated in FIG. 2 by the circular arrow. Said resin paste 54 which is made to rotate with the rotational motion 57 in the doctor blade unit 50 can be referred to as a resin roll.

Since the direct process in SMC production requires a relatively short curing period of the semi-finished product, an accelerated or rapid thickening or increase in the viscosity of the resin paste is necessary in order to provide direct processing of the compound in the press tool. This necessary rapid thickening leads to the consequence that the resin paste material in the doctor blade unit is highly time-critical because it cures within a relatively short period of time, especially in approximately 10 minutes.

The accelerated increase in the viscosity places new challenges on feeding the doctor blade unit, which cannot or insufficiently be fulfilled by a static, freely standing filling tube in many cases.

It was recognized that the rolling motion of the resin roll in the doctor blade unit can lead to the consequence that the resin paste that is freshly introduced into the doctor blade unit is supplied to the exterior of the resin roll and thus moves with the rolling motion of the resin roll on its outer circumference, so that only the resin paste that is freshly introduced into the doctor blade unit is removed from the surface of the resin roll to the carrier film and is drawn onto said film, whereas the older resin paste material situated in a middle region of the resin roll remains in that position and thickens continuously, which is shown in black in FIG. 3 as a thickened resin paste material 58. During the operation of the installation, said region 58 of thickening and already thickened resin paste material grows constantly, which leads to a rising weight of the thickened roll and thus to a displacement of further supplied fresh resin paste material up to the rear wall 52 of the doctor blade unit and thus consequently to a blockage of the doctor blade unit gap 59, which leads to a termination in the production. However, even a small resin roll that is too heavy is still detrimental to production, which due to its own weight can lead to a pulsating and therefore irregular delivery of resin paste through the doctor blade gap 59.

It is therefore the object of the invention to provide a method and a doctor blade apparatus which prevents blockage of the doctor blade gap and therefore prevents a termination in the production.

It is a further object of the invention to provide a method and a doctor blade apparatus which prevents the accumulation of thickening resin paste material which accumulates in the resin roll.

Finally, the invention provides a resin mat installation which is suitable to operate with a rapidly thickening resin paste, preferably in direct process, and to enable permanent operation for producing especially fiber-reinforced resin mats.

These and other objects of the invention are achieved by a method, a doctor blade apparatus and a resin mat installation described in the embodiments below.

Further preferred embodiments of the invention are shown in the dependent claims.

In a first aspect, the present invention relates to a method for applying a reactive resin paste onto a carrier film, comprising the following steps: feeding resin paste into a doctor blade unit by means of a feed device, wherein the feed device comprises a discharge opening through which the resin paste is fed from the feed device into the doctor blade unit, and wherein said doctor blade unit comprises a doctor blade, moving the carrier film on a base surface through a doctor blade gap that is formed between the doctor blade and the base surface, thus spreading the resin paste onto the carrier film by means of the doctor blade, wherein the discharge opening is positioned to be immersed into the resin paste situated in the doctor blade unit.

A operationally controlled filling of the doctor blade unit can be achieved by the method. It can further be achieved that the dwell time of resin paste material in all regions of the doctor blade unit is substantially constant. This represents a major advantage in order to achieve the goal of constant quality of the SMC semi-finished product to be produced.

The discharge opening is positioned especially preferably in such a way that resin paste material situated in the doctor blade unit is subjected to a spiral motion from the location of the introduction by the feed device to the outer edge of the resin roll.

The feed device can preferably be moved along a traversing axis extending substantially parallel to the doctor blade, especially up to the side walls of the doctor blade unit.

It can also be useful in this connection to provide an alternating motion parallel to the draw-off direction of the carrier film, thus leading to a sawtooth-like, zigzag-like and/or looped motion pattern of the filling tube or the discharge opening along the doctor blade for example.

The feed device can be formed by at least one filling tube, at the end of which the discharge opening is formed.

The quantity of the supplied resin paste can further preferably be detected in a contactless manner, especially by means of laser sensor. The discharge opening can be positioned at a height above the carrier film which is situated between ⅓ and ⅔ of the height of the resin paste situated in the doctor blade unit, especially preferably at half the height of the resin paste.

In a second aspect, the present invention relates to a doctor blade apparatus for applying a reactive resin paste to a carrier film, wherein the arrangement comprises a doctor blade unit and a feed device for supplying resin paste to the doctor blade unit, wherein the doctor blade unit comprises a doctor blade and a base surface, between which a doctor blade gap is formed through which a carrier film can be moved, so that resin paste can be spread by means of a doctor blade, wherein the feed device comprises a discharge opening in order to supply resin paste to the doctor blade unit, wherein the discharge opening is positioned in such a way that it is immersed in the resin paste situated in the doctor blade unit during operation of the doctor blade apparatus.

The feed device preferably comprises drive means in order to move the discharge opening along a traversing axis which is substantially parallel to the doctor blade, which occurs especially substantially over the entire width of the doctor blade unit.

The feed device can be formed by at least one filling tube, wherein the discharge opening is arranged at its one end. The discharge opening can be positioned at a height above the carrier film which is between ⅓ and ⅔ of the height of the resin paste situated in the doctor blade unit, preferably at approximately half the height of the resin paste.

The discharge opening is preferably positioned at a height of between 15 and 20 mm above the carrier film and/or at a distance of 5 to 10 mm from the doctor blade.

The doctor blade apparatus further preferably comprises a sensor, especially a laser sensor, for the contactless detection of the quantity of the supplied material.

The present invention relates in a third aspect to a resin mat installation with at least one doctor blade apparatus.

The doctor blade apparatus or the resin mat installation can be operated independently, but are also especially suitable for performing the method.

Further advantageous measures and embodiments of the subject matter of the invention are described in the description below by reference to the drawings, wherein.

Figure 4:
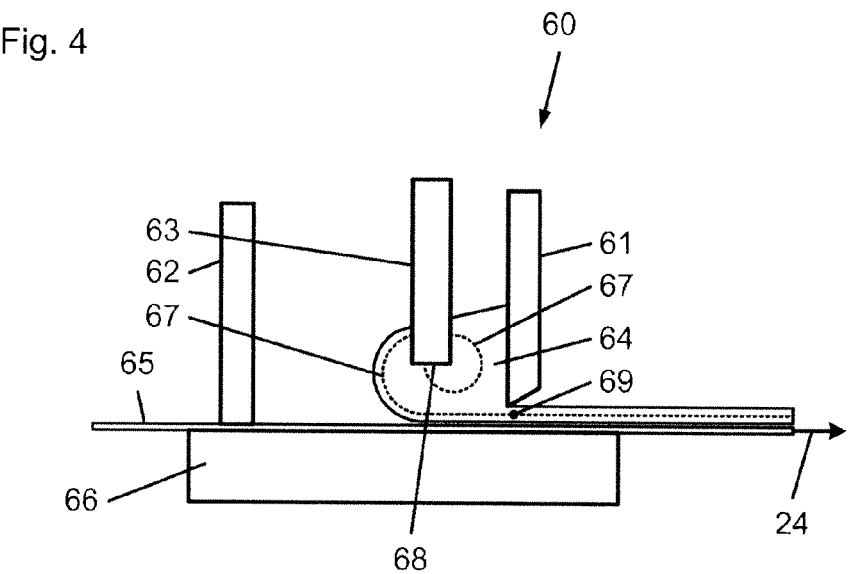
FIG. 4 shows the supply of resin paste material in a doctor blade unit of a doctor blade apparatus according to an embodiment of the present invention.

FIG. 4 shows a doctor blade apparatus according to a preferred embodiment of the present invention. The illustration shows that the doctor blade apparatus comprises a doctor blade 61, which forms a doctor blade unit 60 together with the rear wall 62. A feed device, which is preferably provided in form of a filling tube 63 having a discharge opening 68 at its end, is used for supplying fresh resin paste material and introducing said material into the doctor blade unit 60. The introduced resin paste 64 accumulates in the doctor blade unit 60. A carrier film 65 is moved resting on a base surface 66 in a draw-off direction 24 through a doctor blade gap 69 formed between the base surface 66 and the doctor blade 61, or between the carrier film 65 and the doctor blade 61 by formation of a doctor blade gap, so that the resin paste 64 situated in the doctor blade gap 60 is spread by means of the doctor blade 61 onto the carrier film 65, wherein a resin base layer 58 with a thickness according to the height of the doctor blade gap 69 is formed on the carrier film 65.

As is shown in FIG. 4, the discharge opening 68 of the filling tube 63 is positioned in such a way that in continuous operation the discharge opening 68 is immersed in the resin paste 64 situated in the doctor blade unit 60. The discharge opening 68 is preferably immersed at a height in a range of between ⅓ and ⅔ of the height of the resin paste 64 situated in the doctor blade unit 60. In an especially preferred way, the discharge opening 68 of the filling tube 63 is immersed centrally into the resin paste 64. As is shown in FIG. 4, the filling tube 63 can be aligned substantially perpendicularly in an upright manner. It is also possible to arrange the filling tube 63 at an angle in relation to the perpendicular. As a result, the filling tube 63 can be tilted in such a way for example that the discharge opening 68 protrudes in the direction of movement along the traversing axis 70 and is virtually pressed into the resin paste 64 in the direction of movement. Similarly, the filling tube 63 can be tilted in such a way for example that the discharge opening 68 trails in the movement direction 71 along the traversing axis 70 and is virtually drawn along. It is also possible that the filling tube 63, which is actuated by suitable drive means, changes between these two tilting positions 72 (FIG. 5).

With the aforementioned positioning of the discharge opening 68 immersed in the resin paste 64, the fresh resin paste material which is supplied by the feed device is introduced directly into the interior of the resin paste 64 or resin roll, as a result of which resin paste material which is already situated in said inner region of the resin roll is displaced from said in a region. This leads to the consequence, together with the rolling motion of the resin roll in the doctor blade unit 60 caused by the drawing-off of the carrier film 65, that the resin paste 64 is subjected in the resin roll to a spiral flow motion, which will subsequently be referred to as the spiral motion 67. As a result, resin paste material situated in the interior of the resin roll moves gradually towards the outer edge of the resin roll in order to be finally spread onto a carrier film 65.

It is prevented in this manner that a dead space forms in the center of the resin roll in which resin paste material 58 remains and continuously thickens.

Figure 5:
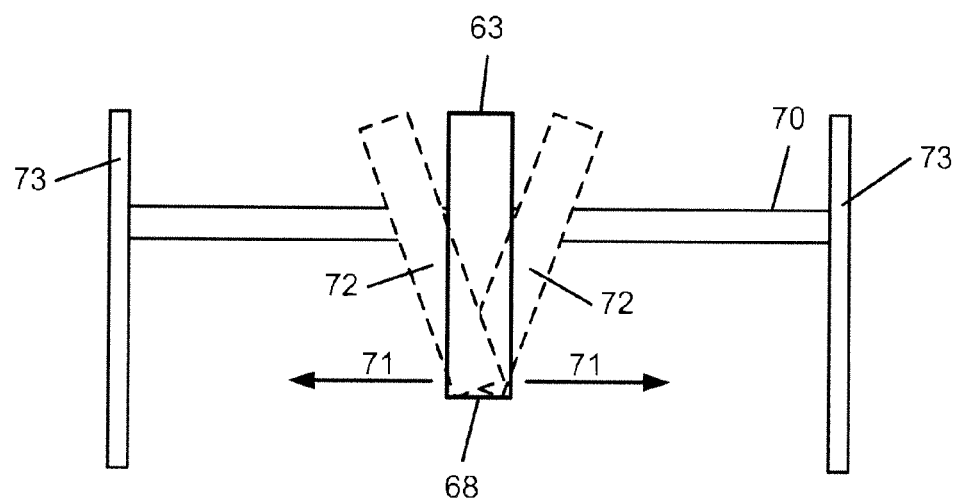
FIG. 5 shows the movement of a filling tube along a traversing axis and a potential adjustment and/or tilting movement of the filling tube.

In order to achieve the spiral motion 67 shown in FIG. 4 (regularly) over the entire width of the doctor blade unit, it is preferred that—as shown in FIG. 5—the filling tube 63 is coupled to a drive apparatus (not shown) which subjects the filling tube 63 to a traversing movement along a traversing axis 70 parallel to the doctor blade 61 and parallel to the base surface 66 or the carrier film 65, as indicated by the arrows (movement direction 71). It is especially preferred in this respect that the filling tube 63 is displaced in the traversing movement along the traversing axis 70 substantially up to the side wall 73 of the doctor blade unit 60, so that the desired spiral movement 67 and the desired mixing effect is achieved there too. As a result fresh resin paste material is introduced through the discharge opening 68 successively over the entire length of the resin roll in its center. In addition, the traversing movement of the filling tube 63 leads to the consequence that the filling tube 63 introduces a mixing effect into the resin paste 64 with its end section immersed in the resin paste 64, which additionally achieves an even better thorough mixing and conveyance of the flow of the resin paste material into the resin roll. The likelihood of thickening of resin paste material is counteracted in this manner.

As a result of the aforementioned procedures in the supply of the doctor blade unit 60, an operationally controlled filling of the doctor blade unit 60 can be achieved. It is further achieved that the dwell time of resin paste material in all regions of the doctor blade unit 60 is substantially constant. This represents a major advantage in order to achieve the goal of constant quality of the SMC semi-finished product.

The quantity of the introduced resin paste material is preferably detected in a contactless manner by means of a sensor (not shown). This allows checking and/or controlling the introduced resin paste material. A laser sensor can be used as a sensor.

The sensor can be fixed in a stationary manner in relation to the doctor blade unit 60. Alternatively, the sensor can be coupled to the feed device and move with said device. It can thus be achieved in a simple manner that the sensor detects the resin paste material present relative to the filling tube 64 and to the discharge opening 68. Furthermore, a linear or flat measurement from above, in sections or over the entire width of the doctor blade can be provided.

As already mentioned above, it is especially preferred if the discharge opening 68 is immersed centrally into the resin roll. Said central positioning can be determined for example in relation to the height of the resin roll formed in the doctor blade unit 60. This height depends on the formulation of the resin filling material mixture, especially the obtained viscosity of the resin paste 64. In the case of formulations of higher viscosity, a higher resin roll is formed in the doctor blade unit, and a lower resin roll in the case of low viscosity. The height of the resin roll can be approximately 30 to 40 mm for example.

Irrespective thereof, it is especially preferred if the discharge opening 68 is positioned at a height of approximately 15 to 20 mm above the carrier film 65.

Experiments have shown that a distance of the discharge opening 68 from the doctor blade 61 in the range of approximately 5 to 10 mm as measured from the edge of the discharge opening 68 or the edge of the filling tube has proven to be especially suitable. It is therefore preferred that the traversing axis 70 of the movement is set up in such a way that the discharge opening 68 is moved at this height above the carrier film 65 and/or at this distance from the doctor blade 61. The traversing axis 70 can be arranged as a fixed axis. It is similarly possible that the traversing axis can be adjusted with respect to its distance from the doctor blade 61 and/or at a distance from the carrier film 65. This can be advantageous especially in installations in which different formulations of the resin filling material mixture can be used depending on the production order, e.g. for a large variety of molded parts 21.

The width of the carrier film 65 can be chosen depending on the required throughput and production width. A small unit can have a production width in a range of between 400 and 800 mm, wherein a carrier film 65 can have a width of 900 mm for this purpose. The speed with which the carrier film 65 is moved in the draw-off direction 24 depends on the production speed of the installation and thus on the throughput of SMC. The speed can vary between 0.6 and 3.5 m/minute.

The height or thickness of the resin paste 64 or resin base layer 5/8 which is spread onto the carrier from 65 can be chosen depending on the mass per unit area of the resin mats 10 which is to be achieved. The resin paste 64 is spread by the doctor blade unit 60 with a thickness of 1 mm for example onto the carrier film 65.

As already described above, the object of the invention is achieved by the positioning of the discharge opening 68 of the filling tube 63 that is immersed in the resin roll, and preferably by the additional traversing movement of the filling tube 63. No further components are required in addition to the filling tube 63. This offers the further advantage that as few components as possible and therefore as little surface as possible come into contact with the resin paste material, on which material deposits can form and can thus negatively influence the process.

It is further prevented by additional further components that the doctor blade unit region becomes less easy to access, which would be disadvantageous in this region of a resin mat installation 1 (see FIG. 1) where the available space is relatively small.

Figure 1:
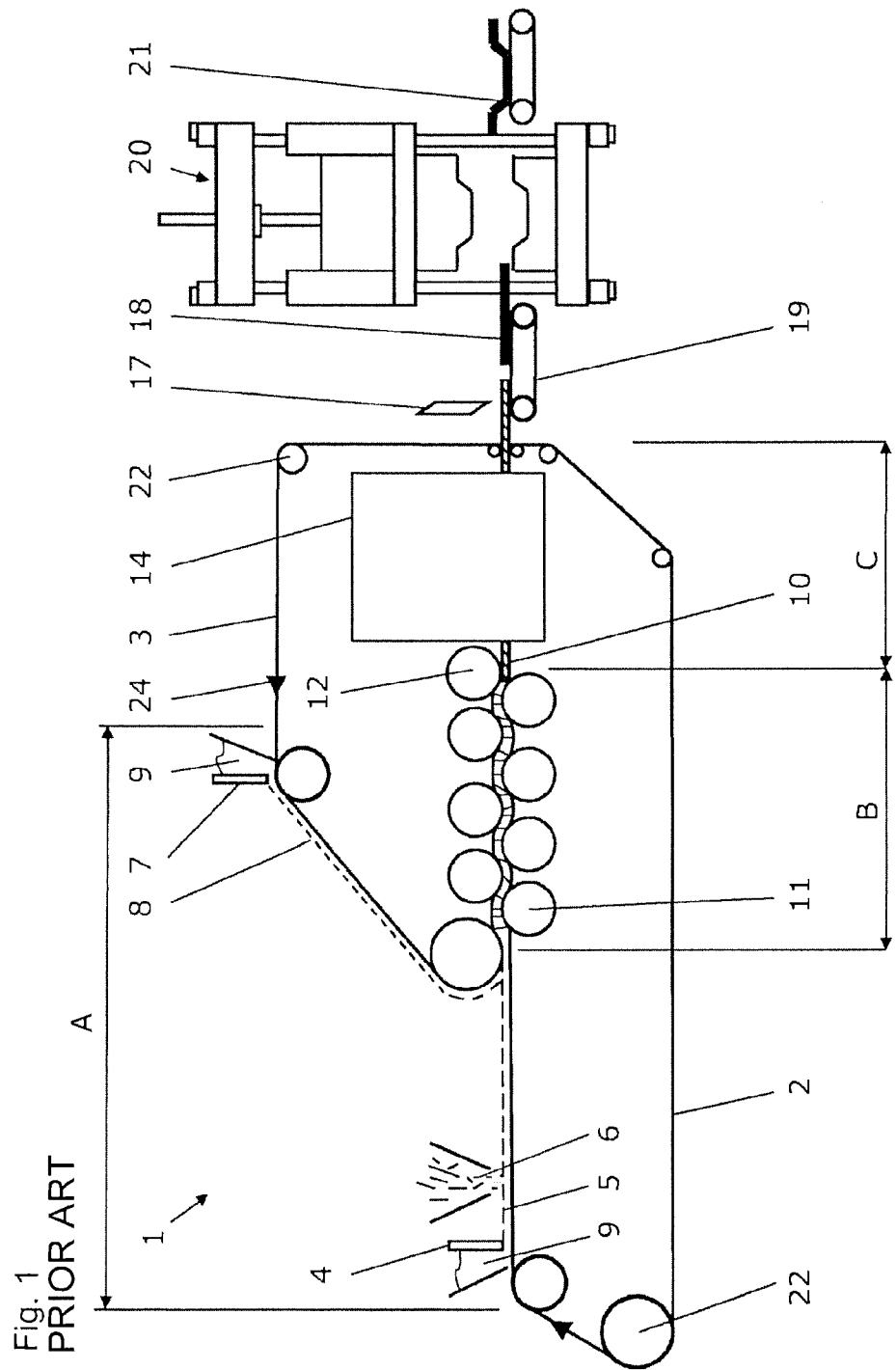
FIG. 1 shows a resin mat installation according to the state of the art.
Figure 2:
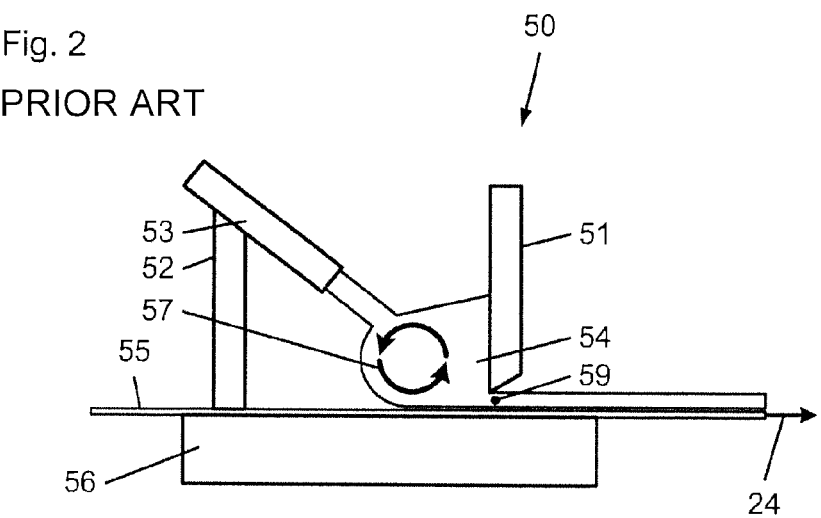
FIG. 2 shows the supply of resin paste material in a doctor blade unit according to the state of the art.
Figure 3:
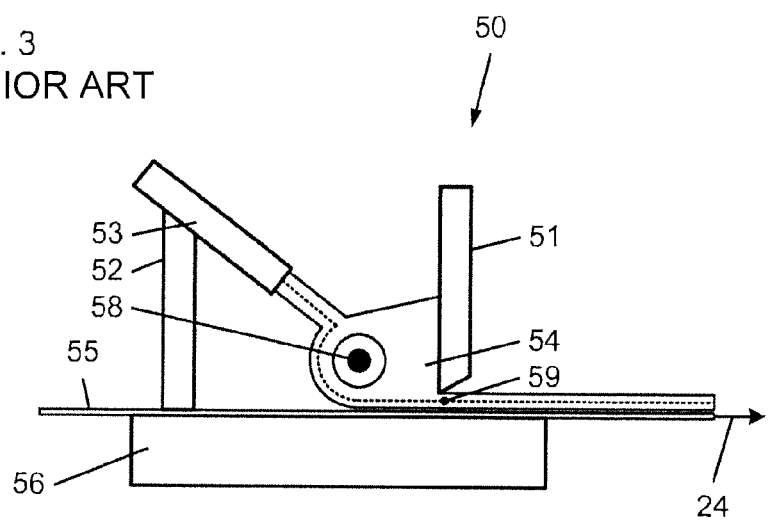
FIG. 3 shows the formation of a roll from accumulating, thickening resin paste material.
Figure 6:
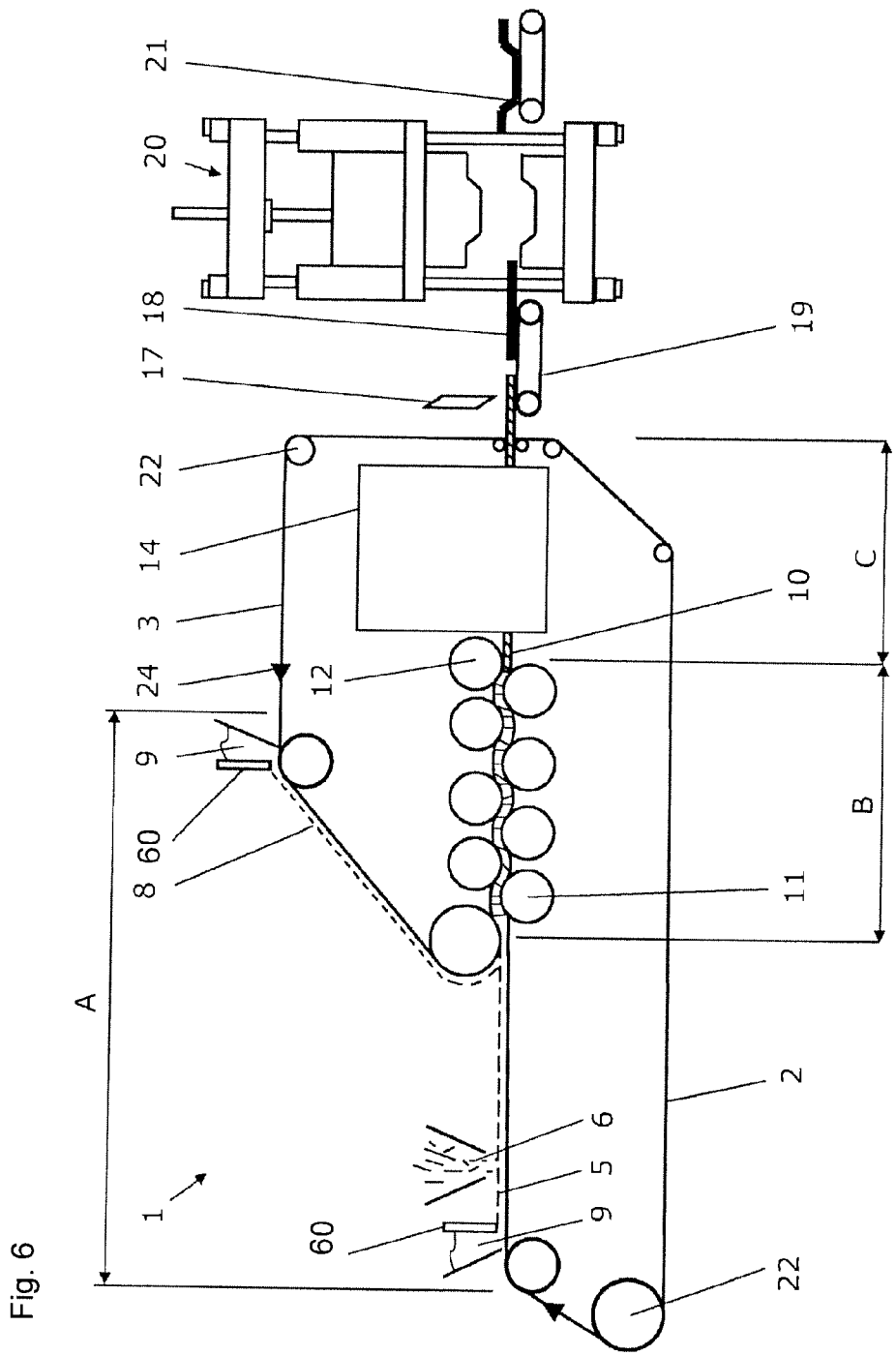
FIG. 6 shows a resin mat installation including the doctor blade unit of the doctor blade apparatus of FIG. 4.

The aforementioned doctor blade apparatuses can be used as a doctor blade 4 and/or doctor blade 7 in the resin mat installation 1 as shown in FIG. 1. FIG. 6 shows a resin mat installation 1 including the doctor blade unit 60 of the doctor blade apparatus of FIG. 4. In FIG. 6, both the doctor blade 4 and the doctor blade 7 of FIG. 1 have been replaced with the doctor blade unit 60. One of ordinary skill in the art would have understood, however, that in other embodiments of the resin mat installation 1, only one of the doctor blade 4 or the doctor blade 7 may be replaced with the doctor blade unit 60.

LIST OF REFERENCE NUMERALS

1 Resin mat installation
2 Bottom belt
3 Upper belt
4 Doctor blade
5 Resin base layer
6 Cut glass (made of rovings and/or long fibers)
7 Doctor blade
8 Resin base layer
9 Resin base
10 Resin mat
11 Rollers (bottom)
12 Rollers (top)
14 Thickening transit storage unit
17 Cutting mechanism
18 Cut mat
19 Feed belt
20 Molding press
21 Molded part
22 Deflection pulley
24 Draw-off direction
50 Doctor blade unit
51 Doctor blade
52 Rear wall
53 Hose feed
54 Resin paste
55 Carrier film
56 Base area
57 Rolling motion
58 Resin paste material (thickened)
59 Doctor blade gap
60 Doctor blade unit
61 Doctor blade
62 Rear wall
63 Filling tube
64 Resin paste
65 Carrier film
66 Base area
67 Spiral movement
68 Discharge opening
69 Doctor blade gap
70 Traversing axis
71 Direction of movement
72 Tilted position
73 Side walls
A Resin base application region
B Walking and impregnating section
C Thickening section

The invention claimed is:

1. A method for applying a reactive resin paste onto a carrier film, comprising the following steps:
   moving a carrier film through a doctor blade unit in a gap formed between a doctor blade and a base surface;
   providing resin paste in front of the doctor blade and spreading the resin paste onto the moving carrier film using the doctor blade, wherein the movement of the carrier film causes a rolling motion in the resin paste in front of the doctor blade;
   feeding additional resin paste into the doctor blade unit through a feed device having a discharge opening immersed in the resin paste in front of the doctor blade, wherein the discharge opening is positioned to displace the resin paste from an inner region of the rolling motion; and
   moving the feed device along a traversing axis extending substantially parallel to the doctor blade.

2. The method according to claim 1, wherein the feed device is moved along the traversing axis substantially up to side walls of the doctor blade unit.

3. The method according to claim 1, wherein the feed device comprises at least one filling tube, at an end of which the discharge opening is formed.

4. The method according to claim 1, further comprising detecting a quantity of a total resin paste without contacting the resin paste, the total resin paste comprising the resin paste in front of the doctor blade and the additional resin paste.

5. The method according to claim 1, wherein the discharge opening is positioned at a height above the carrier film, which lies between $1/3$ and $2/3$ of a height of the resin paste situated in the doctor blade unit.

6. The method according to claim 1, wherein the discharge opening is positioned in such a way that the resin paste situated in front of the doctor blade is subjected to a spiral movement by the feed device from a location of an introduction of the additional resin paste to an outer edge of the resin paste.

7. The method according to claim 1, further comprising detecting a quantity of a total resin paste via a laser sensor without contacting the resin paste, the total resin paste comprising the resin paste in front of the doctor blade and the additional resin paste.

8. The method according to claim 1, wherein the discharge opening is positioned half a height of the resin paste.

* * * * *